April 8, 1952  J. B. ZIMDARS  2,592,098
PLIER-WRENCH WITH GUIDED JAWS
Filed July 1, 1946  4 Sheets-Sheet 1

INVENTOR.
JOHN B. ZIMDARS
BY George B White
ATTORNEY

April 8, 1952    J. B. ZIMDARS    2,592,098
PLIER-WRENCH WITH GUIDED JAWS
Filed July 1, 1946    4 Sheets-Sheet 2
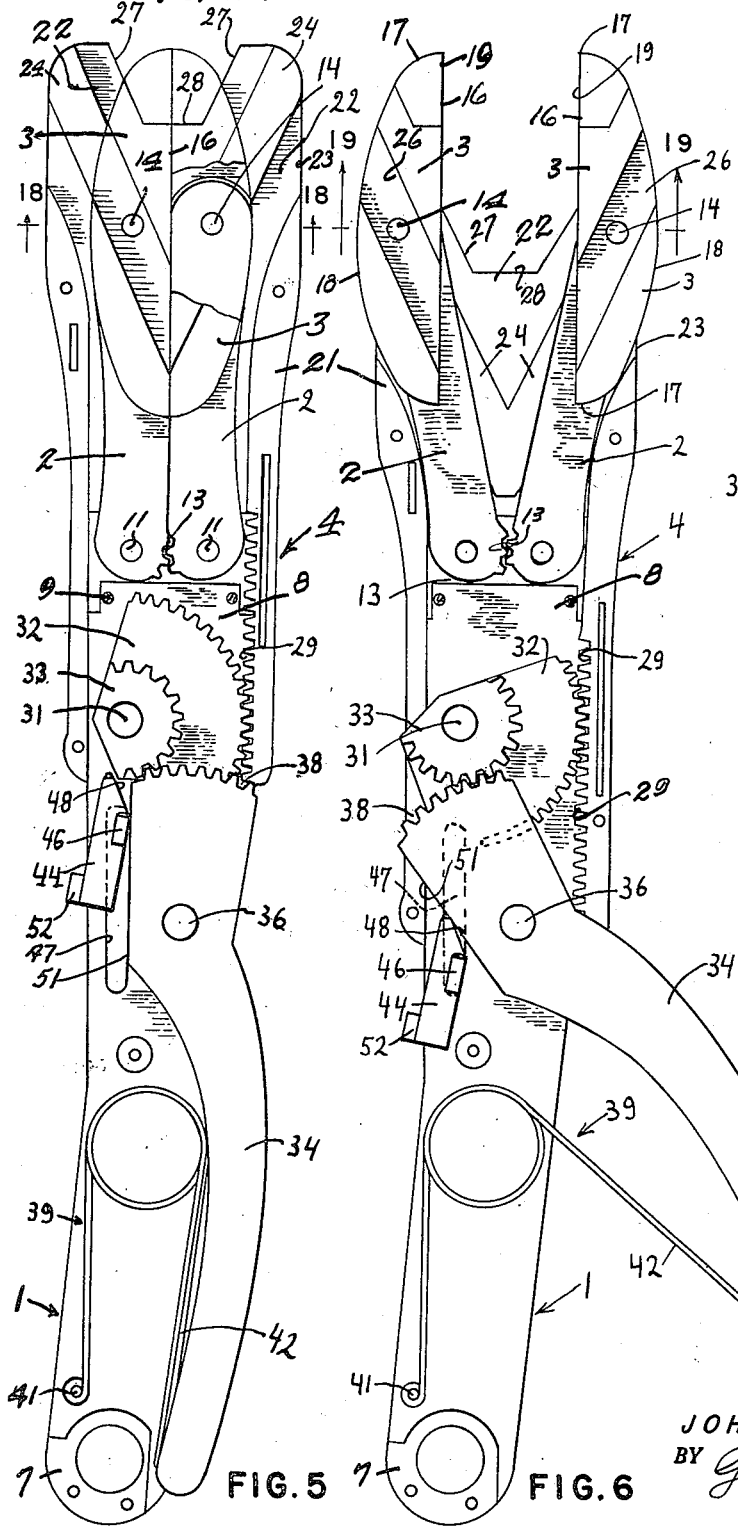
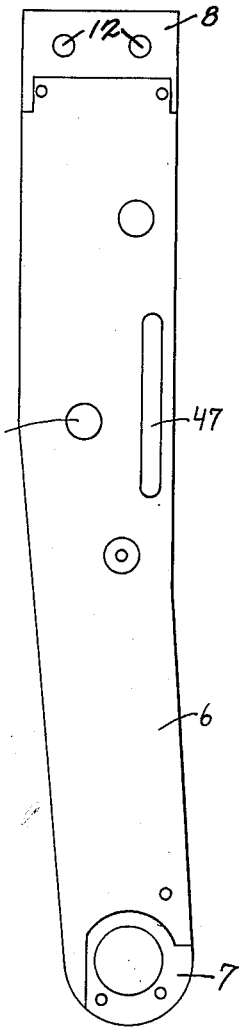
FIG. 5    FIG. 6    FIG. 7
INVENTOR.
JOHN B. ZIMDARS
BY George B. White
ATTORNEY

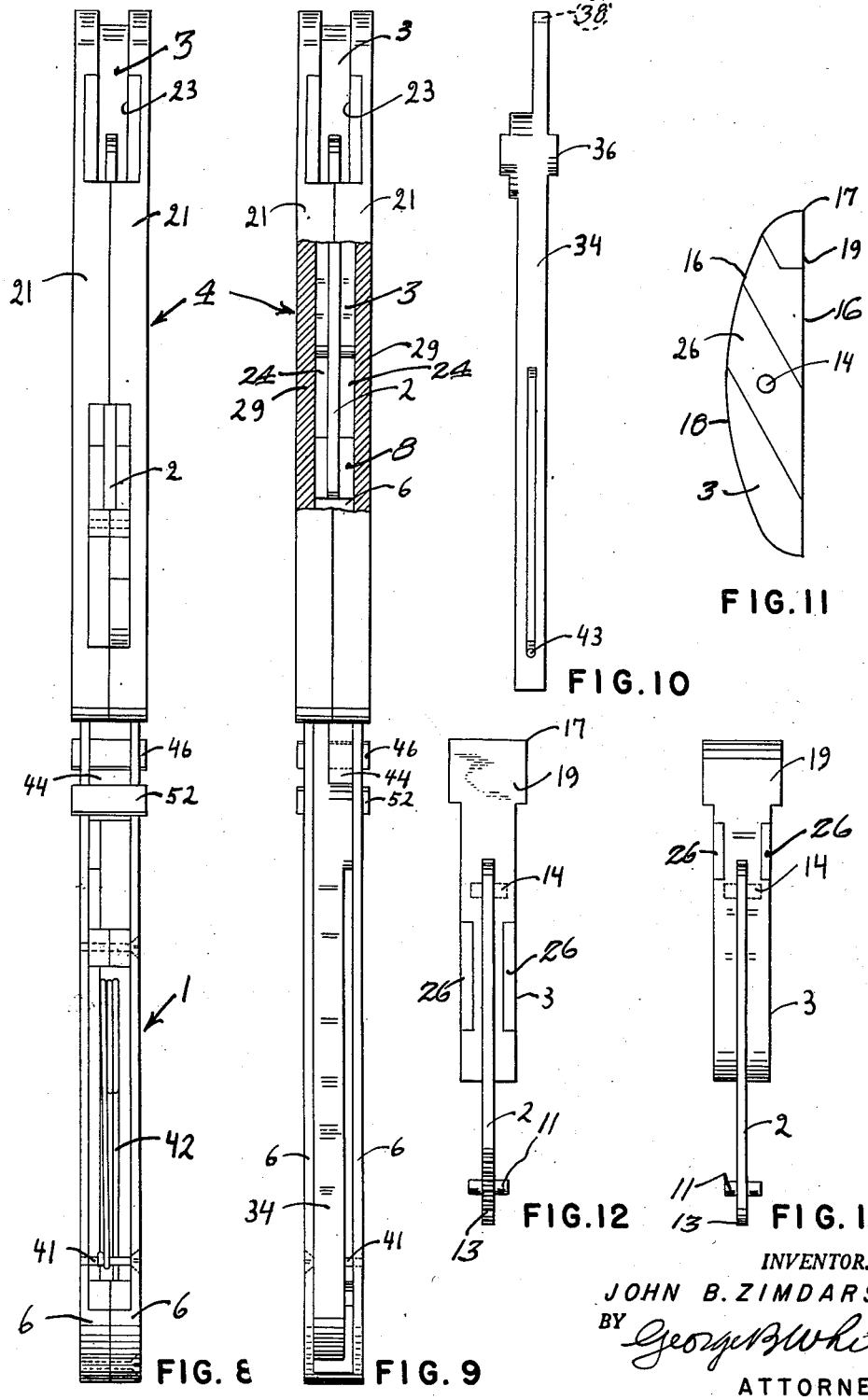

April 8, 1952  J. B. ZIMDARS  2,592,098
PLIER-WRENCH WITH GUIDED JAWS
Filed July 1, 1946  4 Sheets-Sheet 4

INVENTOR.
JOHN B. ZIMDARS
BY George B White
ATTORNEY

Patented Apr. 8, 1952

2,592,098

UNITED STATES PATENT OFFICE 2,592,098

PLIER-WRENCH WITH GUIDED JAWS

John B. Zimdars, San Francisco, Calif.; Hilda Grant executrix of said John B. Zimdars, deceased Application July 1, 1946, Serial No. 680,559

5 Claims. (Cl. 81—78)

This invention relates to a plier-wrench.

The primary object of the invention is to provide a plier-wrench in which by pressing on the handle the opening between the jaws or points can be adjusted and can be held in adjusted position, so as to resist any forces which may tend to pry the jaws apart while the same is in gripping position or operation.

Another object of the invention is to provide a plier-wrench wherein the engagement of the jaws with a frame and with adjusting elements is so coordinated as to achieve maximum grip and strength without permitting any separation of the jaw points from the object gripped or handled.

Another object of the invention is to provide a mechanism for adjusting the jaws of a plier-wrench by an element on the handle so as to allow the operation of the plier-wrench with one hand.

A further object of the invention is to provide a coordinated support for the jaws of a plier-wrench which positively guide the jaws to various openings and lock them against any pressure exerted on the faces of the jaws in operation, and in which the adjustment of the jaws is accomplished by an element moved longitudinally of the wrench by a mechanism on the handle of the plier-wrench arranged for operation by one hand.

Another object of this invention is to provide a plier-wrench which is highly useful and simple in construction and performs the function of a wrench and pliers with the same mechanism. Convenience of arrangement, lightness and comparative inexpensiveness of manufacture are further objects which have been borne in mind in the production and development of the invention.

The essential features of the invention involved in the carrying out of the objects indicated are susceptible to modification, but a preferred embodiment of the invention is shown in the accompanying drawings, in which:

Fig. 5 is a side view of the mechanism in the plier-wrench with one of the sleeve covers removed showing the plier-wrench in completely closed position;

Fig. 6 is a side view of the plier-wrench with part of the sleeve removed, showing the plier-wrench in the open position;

Fig. 7 is a detail side view of a handle plate used in my pliers;

Fig. 8 is an edge view of the plier-wrench assembly;

Fig. 9 is an edge view of the plier-wrench assembly from the edge opposite to that shown in Fig. 8;

Fig. 10 is a detail edge view of the manipulating lever of my plier-wrench;

Fig. 11 is a detail side view of one of the jaws in my plier-wrench;

Fig. 12 is an edge view of one of the jaws and its geared arm lever support;

Fig. 13 is an edge view of the jaw and its supporting arm from the edge opposite to that shown in Fig. 12;

Figure 1:
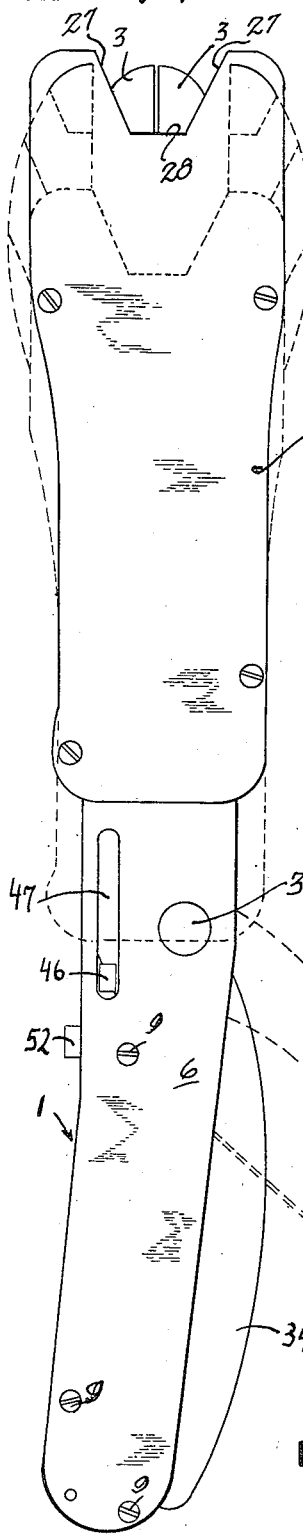
Fig. 1 is a side view of the invention showing it in gripping position, with a dotted line indication of the plier-wrench in the open position.

In the general organization of the plier-wrench of my invention, I include a handle 1 on the upper end of which are pivoted a pair of arms 2, on which latter are in turn pivoted jaws 3. Over the arms 2 and the handle 1 slides an operating sleeve 4 which is connected to the jaws 3 by suitable cam and groove connections, hereinafter described, for holding the gripping faces of the jaws parallel, and for moving the jaws 3 towards one another or apart from one another according to the adjustment of the sleeve 4 relatively to the handle 1, the arms 2 and the jaws 3. Suitable mechanism is provided on the handle 1 and is coordinated with the sleeve 4 for adjusting the sleeve 4 axially with respect to the handle 1 and the entire plier-wrench. Means are provided for fastening or locking the sleeve 4 in adjusted position.

The handle 1 forms the frame for the plier-wrench. In the herein illustration the handle 1 is made of a pair of superimposed plates 6, which are spaced from one another at one end by a suitable boss 7 and at the top by abutting heads 8. The plates 6 thus spaced from one another inclose a space therebetween for the actuating mechanism and for the actuating lever as hereinafter described. The handle plates 6 are provided with suitable aligned holes for the various pivots and securing elements. For instance, in the present illustration the plates are held together by suitable screws 9.

Figure 14:
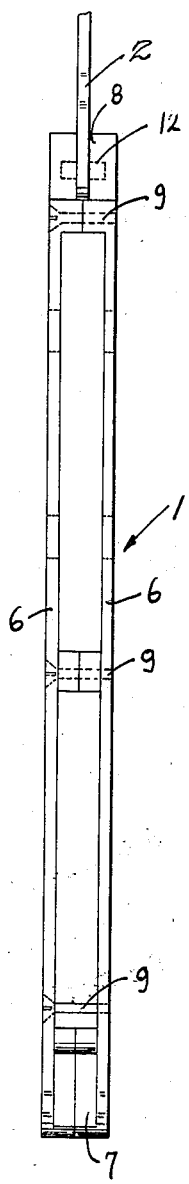
Fig. 14 is an edge view of the handle and casing in which the jaw arms are pivoted.
Figure 15:
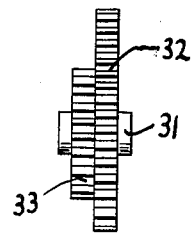
Fig. 15 is a detail edge view of the operating gears and sectors.
Figure 16:
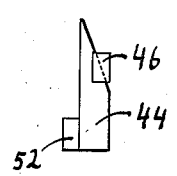
Fig. 16 is a detail view of the detent for holding the wrench-plier in adjusted position.
Figure 17:
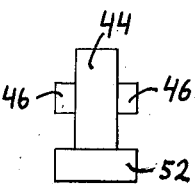
Fig. 17 is a side view of said detent.
Figure 18:
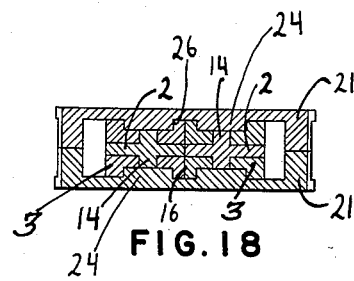
Fig. 18 is a sectional view of the plier-wrench, the section being taken on the lines 18—18 of Fig. 5.
Figure 19:
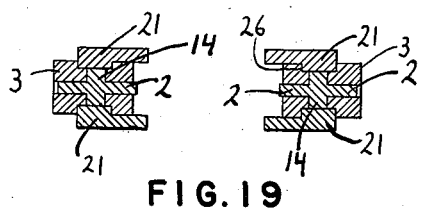
Fig. 19 is a sectional view of the plier-wrench in open position, the section being taken on lines 19—19 of Fig. 6; and, Fig. 20 is a sectional detail view of the operating or guide sleeve, the section being taken on lines 20—20 of Fig. 2.
Figure 20:
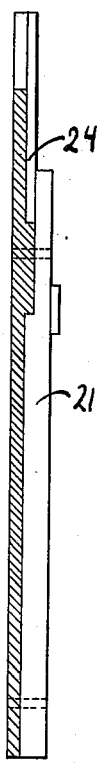

The jaw carrying arms or links 2 are pivoted between the heads 8 of the handle plates 6, particularly as illustrated in Fig. 14. The heads 8 are spaced from one another to a distance equal to the thickness of the jaw arms 2 so that the said jaw arms can be pivoted therebetween. A pivot 11 extends through the lower end of each arm 2 and is journalled in suitable holes 12 in the opposite pivot heads 8 of the handle plates 6. The pivoted ends of the jaw arms 2 are provided with sector gears 13 at adjacent faces thereof which are in mesh so as to hold the pivot arms 2 aligned and also to transmit stresses from one arm to the other and equalize the forces on said jaw arms 2. The upper end of each jaw arm 2 is provided with transverse pivots 14 each of which extends through one of the jaws 3 as particularly shown in Figs. 5 and 6. Each pivot 14 is spaced substantially between the ends of the jaw 3 so as to hold the jaw 3 balanced thereon. The jaw arms 2 are thus allowed to swing outwardly and inwardly together at equal angles with respect to the longitudinal axis of the tool and for the spacing of the jaws 3 from one another.

Each jaw 3 has a substantially straight and plane gripping face 16 with curved end 17, and a convex or arcuate back 18. The gripping point 19 on the outer end of each jaw 3 is widened and preferably knurled or otherwise roughened on the gripping surface thereof.

The control or cam means for moving the jaws 3 apart or toward one another is formed by a connection between the sleeve 4 and the jaws 3. The sleeve 4 in the present structure is made of a pair of complemental half-shells 21 which are held together by suitable securing means such as screws so as to surround a portion of the handle 1 and also the jaws 3. The half-shells 21 are so formed that the sleeve 4 has an enlarged head 22, the edges of which, near the tip of the head are cut away to form slots 23 for accommodating the jaws 3 when in their outermost position. In this enlarged head, and on the inside of the opposite shells 21 are formed cams 24. Each set of cams 24 is formed by a pair of rails converging from the tip of the head inwardly so as to form a substantially V-shaped cam. These rails or cams 24 protrude from the inside surface of the respective shells 21. Each rail cam 24 is at an acute angle to the vertical axis of the sleeve 4. The arrangement of the cams 24 is shown in detail in Figs. 2, 3 and 4. The cams 24 in the opposite shells 21 are spaced from one another so as to accommodate therebetween the jaws 3. Each jaw 3 has on the opposite sides thereof cam grooves 26 inclined with respect to the gripping surface 16 at the same angle as the angle of the corresponding cam 24 bears to the longitudinal axis of the shell 21. Each cam groove 26 fits over an adjacent cam 24 and is movable on the same. As the sleeve 4 is moved in either direction on the handle 1 the cams 24 in the shells 21 thereof move in the respective cam grooves 26 and accordingly shift the jaws 3 outwardly apart from one another or together toward one another, corresponding to the distance between the portions of the cams 24 which are in engagement with the respective cam grooves 26 at the respective adjustments. The angle of incline of the cams 24 and of the cam grooves 26 with respect to the longitudinal axis of the tool is such that prying forces exerted on the faces of the jaws 23 have a tendency to bind the cam grooves 26 onto the rails 24 and lock the same firmer in the adjusted position. In other words a wedging action is accomplished. This wedging action is further augmented by the pivotal engagement of the jaws 3 upon the ends of the jaw arms 2. The forces applied at the gripping head 19 of the jaws 3 when the tool is operated upon an object such as a nut or the like, tend to turn the jaws 3 around their respective pivots 14 and thereby increase the wedging action between the cam grooves 26 and the respective cams 24 in proportion to the prying forces exerted upon the gripping heads 19 of said jaws 3. The forces applied to the jaws 3 when operated are frequently unequal because they are dependent upon the direction of turning in which the tool is applied. Such forces are equalized by a transmission of the same through the gears 13 from one arm 2 to the other arm 2 and to the respective jaws 3.

Figures 2, 3, 4:
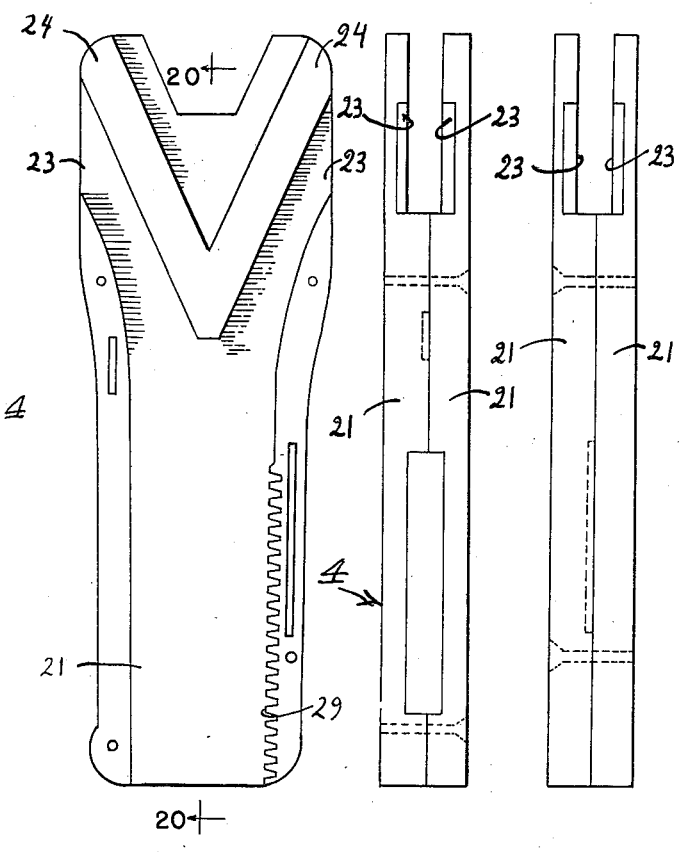
Fig. 2 is a detail side view of one of the guiding and holding elements for the jaws.
Fig. 3 is an edge view of the guiding and adjusting sleeve for the jaws of the plier-wrench.
Fig. 4 is an edge view of said sleeve from the end opposite to that shown in Fig. 3.

The arms 2 extend into a slot in the jaws 3 so as to allow the pivoting of the jaws 3 around their pivots 14 on the arms 2. The tip of the sleeve 4 is cut away between the tips of the cams 24 as shown in Fig. 2. The cut away portion has inwardly extended inclined edges 27 respectively parallel with the cams 24, and a transverse edge 28 in the middle substantially at right angles to the longitudinal axis of the tool. The cut away portion thus formed by the edges 27 and 28 on the bottom of each shell 21 is sufficiently large to accommodate therebetween an article upon which the tool is worked when the jaws 3 are close together.

The adjusting and moving mechanism for the sleeve 4 includes a rack or toothed edge 29 along one edge or side of one of the shells 21 as particularly shown in Figs. 5 and 6. In the handle 1 and between the handle plates 6 is journalled on a pivot shaft 31 a sector gear 32 which is in mesh with the rack teeth 29 so that when the sector gear 32 is rotated in respective directions it moves the sleeve 4 correspondingly toward or away from the end of the handle 1. On one face of the sector gear 32 is a smaller sector gear 33 which is preferably integrally united or otherwise keyed to the larger sector gear 32 so that said sector gears rotate together on the pivot pin 31.

For the convenient adjustment and rotation of the sector gears 32 and 33 a lever 34 is provided. This lever is pivoted on a pin or shaft 36 which latter is secured in suitable holes at 37 in the plate 6 of the handle 1. The lever 34 extends between said handle plates 6. The inner end of the lever 34 extends to the smaller gear 33 and has a sector gear 38 formed at its end in mesh with the smaller sector gear 33 so that when the lever 34 is turned around its pivot 36 it turns the smaller sector gear 33. The outer portion of the lever 34 is curved as shown in Figs. 5 and 6. A spring 39 is anchored on a pin 41 between the handle plates 6 and near the boss 7 and extends from said pin 41 upwardly within the handle 1 and then it is coiled and has an arm 42 extending under the lever 34, and has its end 43 anchored in the lower end of the lever 34. This coiling of the spring 39 causes the arm 42 normally to spring upwardly and outwardly so as to urge the handle 34 into the position shown in Fig. 6. The lever 34 is so curved that it can be conveniently gripped or grasped in one hand and then pressed toward the handle 1 for the purpose of rotating the sector gear 33 in a counter-clockwise direction viewing Fig. 6, and thereby advancing the sleeve 4 towards and over the jaws 3, for closing the jaws together. When released the spring 42 pushes the lever 34 away from the handle 1 thereby rotating the sector gears 32 and 33 in a clockwise direction viewing Fig. 6 so as to move the sleeve over the handle 1 and away from the jaws 3 thereby moving the jaws 3 apart from one another.

If it is necessary to use the herein plier-wrench repeatedly on objects of the same dimensions, for instance on nuts or bolts of the same size, then the distance between the jaws 3 can be held. In other words the tool can be maintained and held in a position adjusted to a selected spacing between its gripping jaws 3. This holding is accomplished by detent 44 shown in detail in Figs. 16 and 17, and in position shown in Figs. 5 and 6. This detent has an ear 46 extended from each side thereof so as to be slidable in respective slots 47 in the opposite handle plates 6. Each ear 46 is narrower than the slot 47 so as to permit slight tilting of the ear 46 when in locking engagement with the lever 34, thereby the ears 46 are frictionally bound or wedged in the slots 47 under the pressure of the lever engagement. The edge of the detent 44 facing towards the lever 34 is tapered or mitered so as to provide an inclined wedge edge 48 for engagement with the inclined adjacent edge 51 of the lever 34. A projection 52 on the lower end of the detent 44, as shown in Figs. 5, 6, 16 and 17 herein, overlaps and abuts the adjacent outer edges of the handle plates 6 and facilitates the pushing of the detent 44 up or down in the slot 47 into or out of engagement with the lever 34. In the closed position of the lever 34, shown in Fig. 5, the lower corner of the wedge edge 48 abuts against the inclined edge 51 of the lever 34 when the detent 44 is pushed up against it, and holds the lever 34 in said closed position. As the lever 34 is opened the inclined face 51 thereof is tilted toward parallelism with the wedge edge 48 and engages the latter nearer its tip when the detent 44 is pushed up against it, as shown in Fig. 6. The engagement of the detent 44 with the adjacent face 51 of the lever 34 on the side of the pivot 36 opposite the spring 42 resists the action of this spring 39 and prevents the outward turning of the lever 34, thus holds the sleeve 4 against sliding over the handle 1. However, this detent engagement permits the further compression of the lever 34 towards the handle 1 and allows the further extension of the sleeve 4 beyond the handle 1 and over the jaws 3 for forcing the jaws 3 in tighter gripping engagement with the article worked on. In this manner an adjustment can be reached for a slide fit over the nut or bolt or other article gripped and such adjustment can be maintained. After the plier-wrench is placed over the article, then the lever 34 can be pressed toward the handle 1 for a tight grip for the turning motion.

In operation the handle 1 and the outer portion of the lever 34 are held in the palm of the hand and are pressed together so as to turn the lever 34 in toward the handle 1 and in a counter-clockwise direction viewing Fig. 6. In this manner the sector gears 32 and 33 are turned in counter-clockwise direction viewing the same figure, and the sleeve 4 is moved away from the end of the handle 1 and over the jaws 3 for moving the jaws 3 together. The extreme position of the closed position of the jaws is shown in Fig. 5. Naturally, the spacing between the jaws 3 is such that it grips the periphery of the object handle. As the sleeve 4 moves upwardly the cams 24 move therewith in the cam grooves 26 and as the converging portion of the cams 24 enter into and travel in the cam grooves 26 of the jaws 3 the jaws are brought closer together. In this motion the jaws 3 turn the arms 2 which through the gears 13 equalize the movement of the two jaws and the transmission of forces and the reaction forces when the plier-wrench is used upon an article gripped between the jaws 3. In case of repeated use on the same article the detent 44 is pushed up into engaging position with the adjacent position. The jaws in this position maintain the predetermined spacing for further work, but permit further movement of the jaws for tighter gripping, thereby reducing to a minimum the amount of lever action at each subsequent operation. In the event a larger opening is required the detent 44 is released or moved down in the slot 47 allowing the unlimited outward swinging of the lever 34 and the returning of the sleeve 4 to its extreme withdrawn position, thereby locating the widest spaced ends of the cams 24 in the cam grooves 26. In packing away the tool or otherwise holding it, it is preferable to have it in the closed position shown in Fig. 5 wherein the lever 34 is pressed against the handle 1 and the detent locks the lever in that position with the jaws 3 substantially in face to face contact. The plier-wrench heretofore described is easy to handle; it can be made of suitable strong material, yet with sufficient lightness for manual operation. It can be manipulated by one hand and achieve firm grip with easy operation by merely compressing the lever toward the handle. Except for the adjustment of holding the predetermined spacing of jaws, no other adjustment is required and the tool is easily handled by labor ordinarily available.

I claim:

1. In a plier-wrench of the character described, a handle, gripping jaws, pivoted elements connecting said jaws to said handle, said gripping jaws having gripping faces opposite to one another, an element slidable on said handle, cam means connecting said element to said jaws to move them away from and toward one another according to the sliding of said element on said handle, a gear mechanism on the handle, a member on said sliding element engaging said gear mechanism to be moved thereby to hold and move said element along said handle, and a lever adjacent the handle for manipulating said gear mechanism for the sliding of said element.

2. In a plier-wrench of the character described, a handle, gripping jaws, pivoted elements connecting said jaws to said handle, said gripping jaws having gripping faces opposite to one another, an element slidable on said handle, cam means connecting said element to said jaws to move them away from and toward one another according to the sliding of said element on said handle, a gear mechanism on the handle, a member on said sliding element engaging said gear mechanism to be moved thereby to hold and move said element along said handle, a lever adjacent the handle for manipulating said gear mechanism for the sliding of said element, and spring means on said handle for normally urging said lever to move said gear mechanism and said sliding element into a position for the full opening of said jaws.

3. In a plier-wrench of the character described, a handle, gripping jaw, pivoted elements connecting said jaws to said handle, said gripping jaws having gripping faces opposite to one another, an element slidable on said handle, cam means connecting said element to said jaws to move them away from and toward one another according to the sliding of said element on said handle, a gear mechanism on the handle, a member on said sliding element engaging said gear mechanism to be moved thereby to hold and move said element along said handle, a lever adjacent the handle for manipulating said gear mechanism for the sliding of said element, spring means on said handle for normally urging said lever to move said gear mechanism and said sliding element into a position for the full opening of said jaws, and releasable fastening means on the handle engaging said lever for holding said lever and sliding element in adjusted position against the action of said spring means.

4. In a plier-wrench of the character described, a hollow handle, a pair of gripping jaws having gripping faces opposite and parallel to one another, an arm pivoted to each jaw and pivoted in the end of said handle, a hollow sleeve slidable over said handle and over said arms and said jaws, cams on the inner face of said sleeve adjacent said jaws and converging toward said handle, said jaws having cam grooves thereon at the same angles as said cams and being slidably engaged by said cams to guide said jaws toward one another and away from one another according to the sliding of said sleeve on said handle, a toothed edge on the inside of said sleeve, a geared mechanism inside of said hollow handle engaging the teeth of said sleeve edge for moving said sleeve on said handle, a lever pivoted in said hollow handle and engaging said gear mechanism for actuating the same, and resilient means to normally urge said lever away from said handle to a position where said sleeve is drawn over said handle and away from said jaws.

5. In a plier-wrench of the character described, a hollow handle, a pair of gripping jaws having gripping faces opposite and parallel to one another, an arm pivoted to each jaw and pivoted in the end of said handle, a hollow sleeve slidable over said handle and over said arms and said jaws, cams on the inner face of said sleeve adjacent said jaws and converging toward said handle, said jaws having cam grooves thereon at the same angles as said cams and being slidably engaged by said cams to guide said jaws toward one another and away from one another according to the sliding of said sleeve on said handle, a toothed edge on the inside of said sleeve, a geared mechanism inside of said hollow handle engaging the teeth of said sleeve edge for moving said sleeve on said handle, a lever pivoted in said hollow handle and engaging said gear mechanism for actuating the same, and resilient means to normally urge said lever away from said handle to a position where said sleeve is drawn over said handle and away from said jaws, a detent slidably held in said handle and movable against said lever for arresting the movement of said lever away from said handle under the action of said spring.

JOHN B. ZIMDARS.

REFERENCES CITED

The following references are of record in the file of this patent:

UNITED STATES PATENTS

| Number | Name | Date |
| --- | --- | --- |
| 148,566 | Kennedy | Mar. 17, 1874 |
| 439,743 | Charlton | Nov. 4, 1890 |
| 573,548 | Sours | Dec. 22, 1896 |
| 588,110 | Hoeft | Aug. 10, 1897 |
| 605,444 | Frederickson | June 7, 1898 |
| 1,168,125 | Stowell | Jan. 11, 1916 |